United States Patent
Carlson et al.

(10) Patent No.: US 7,489,843 B2
(45) Date of Patent: Feb. 10, 2009

(54) POLYURETHANE TO POLYETHYLENE ADHESION PROCESS

(75) Inventors: Scott Carlson, Bloomington, MN (US); Dennis Ray Wells, Richfield, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/702,914

(22) Filed: Feb. 6, 2007

(65) Prior Publication Data

US 2008/0187274 A1 Aug. 7, 2008

(51) Int. Cl.
*G02B 6/44* (2006.01)
*B29D 11/00* (2006.01)

(52) U.S. Cl. .................. 385/100; 264/1.28; 264/39

(58) Field of Classification Search ......... 385/134–137, 385/100
See application file for complete search history.

(56) References Cited

U.S. PATENT DOCUMENTS

| | | | |
|---|---|---|---|
| 2,047,152 A | 7/1936 | Mitchell | |
| 3,691,505 A | 9/1972 | Graves | |
| 3,845,552 A | 11/1974 | Waltz | |
| 3,879,575 A | 4/1975 | Dobbin et al. | |
| 3,912,854 A | 10/1975 | Thompson et al. | |
| 3,912,855 A | 10/1975 | Thompson et al. | |
| 4,085,286 A | 4/1978 | Horsma et al. | |
| 4,107,451 A | 8/1978 | Smith, Jr. et al. | |
| 4,152,539 A | 5/1979 | Charlebois et al. | |
| 4,322,573 A | 3/1982 | Charlebois | |
| 4,343,844 A | 8/1982 | Thayer et al. | |
| 4,405,083 A | 9/1983 | Charlebois et al. | |
| 4,413,881 A | 11/1983 | Kovats | |
| 4,467,137 A | 8/1984 | Jonathan et al. | |
| 4,475,935 A | 10/1984 | Tanaka et al. | |
| 4,481,380 A | 11/1984 | Wood et al. | |
| 4,490,315 A | 12/1984 | Charlebois et al. | |
| 4,512,628 A | 4/1985 | Anderton | |
| 4,528,150 A | 7/1985 | Charlebois et al. | |
| 4,528,419 A | 7/1985 | Charlebois et al. | |
| 4,549,039 A | 10/1985 | Charlebois et al. | |
| 4,550,220 A | 10/1985 | Kitchens | |
| 4,556,281 A | 12/1985 | Anderton | |
| 4,570,032 A | 2/1986 | Charlebois et al. | |
| 4,581,480 A | 4/1986 | Charlebois | |

(Continued)

FOREIGN PATENT DOCUMENTS

| | | |
|---|---|---|
| DE | 35 37 684 A1 | 4/1987 |
| EP | 0 115 725 A1 | 8/1984 |
| EP | 1 361 465 A1 | 11/2003 |
| FR | 2 231 877 | 12/1974 |
| JP | 58-105114 | 6/1983 |

(Continued)

OTHER PUBLICATIONS

"Cable Assemblies: Molding & Termination," http://www.dgo.com/prodcable.htm, 8 pages (Copyright 2001).

(Continued)

*Primary Examiner*—Sarah Song
(74) *Attorney, Agent, or Firm*—Merchant & Gould P.C.

(57) ABSTRACT

A telecommunications cable includes a distribution cable, a tether branching from the distribution cable at a breakout location, and an enclosure that surrounds the breakout location. The enclosure is secured to the distribution cable at first and second adhesion regions. The enclosure can also secure to the tether at a third adhesion region. The adhesion regions are treated by sanding the regions, cleaning the regions, and then plasma-etching the regions immediately before welding/injection molding the enclosure around the breakout location.

26 Claims, 10 Drawing Sheets

U.S. PATENT DOCUMENTS

| | | | |
|---|---|---|---|
| 4,589,939 A | 5/1986 | Mohebban et al. |
| 4,591,330 A | 5/1986 | Charlebois et al. |
| 4,592,721 A | 6/1986 | Charlebois et al. |
| 4,595,256 A | 6/1986 | Guazzo |
| 4,609,773 A | 9/1986 | Brown et al. |
| 4,625,073 A | 11/1986 | Breesch et al. |
| 4,629,597 A | 12/1986 | Charlebois et al. |
| 4,648,606 A | 3/1987 | Brown et al. |
| 4,648,919 A | 3/1987 | Diaz et al. |
| 4,654,474 A | 3/1987 | Charlebois et al. |
| 4,666,537 A | 5/1987 | Dienes |
| 4,670,069 A | 6/1987 | Debbaut et al. |
| 4,670,980 A | 6/1987 | Charlebois et al. |
| 4,678,866 A | 7/1987 | Charlebois |
| 4,684,764 A | 8/1987 | Luzzi et al. |
| 4,701,574 A | 10/1987 | Shimirak et al. |
| 4,725,035 A | 2/1988 | Charlebois et al. |
| 4,732,628 A | 3/1988 | Dienes |
| 4,747,020 A | 5/1988 | Brickley et al. |
| 4,761,052 A | 8/1988 | Buekers et al. |
| 4,764,232 A | 8/1988 | Hunter |
| 4,818,824 A | 4/1989 | Dixit et al. |
| 4,822,434 A | 4/1989 | Sawaki et al. |
| 4,875,952 A | 10/1989 | Mullin et al. |
| 4,884,863 A | 12/1989 | Throckmorton |
| 4,913,512 A | 4/1990 | Anderton |
| 4,961,623 A | 10/1990 | Midkiff et al. |
| 4,963,698 A | 10/1990 | Chang et al. |
| 5,004,315 A | 4/1991 | Miyazaki |
| 5,042,901 A | 8/1991 | Merriken et al. |
| 5,046,811 A | 9/1991 | Jung et al. |
| 5,054,868 A | 10/1991 | Hoban et al. |
| 5,066,095 A | 11/1991 | Dekeyser et al. |
| 5,074,808 A | 12/1991 | Beamenderfer et al. |
| 5,097,529 A | 3/1992 | Cobb et al. |
| 5,099,088 A | 3/1992 | Usami et al. |
| 5,115,105 A | 5/1992 | Gallusser et al. |
| 5,121,458 A | 6/1992 | Nilsson et al. |
| 5,125,060 A | 6/1992 | Edmundson |
| 5,185,844 A | 2/1993 | Bensel, III et al. |
| 5,194,692 A | 3/1993 | Gallusser et al. |
| 5,210,812 A | 5/1993 | Nilsson et al. |
| 5,217,808 A | 6/1993 | Cobb |
| 5,241,611 A | 8/1993 | Gould |
| 5,245,151 A | 9/1993 | Chamberlain et al. |
| 5,335,408 A | 8/1994 | Cobb |
| 5,347,089 A | 9/1994 | Barrat et al. |
| 5,353,367 A | 10/1994 | Czosnowski et al. |
| 5,376,196 A | 12/1994 | Grajewski et al. |
| 5,378,853 A | 1/1995 | Clouet et al. |
| 5,394,502 A | 2/1995 | Caron |
| 5,402,515 A | 3/1995 | Vidacovich et al. |
| 5,410,105 A | 4/1995 | Tahara et al. |
| RE34,955 E | 5/1995 | Anton et al. |
| 5,420,958 A | 5/1995 | Henson et al. |
| 5,440,665 A | 8/1995 | Ray et al. |
| 5,442,726 A | 8/1995 | Howard et al. |
| 5,450,517 A | 9/1995 | Essert |
| 5,491,766 A | 2/1996 | Huynh et al. |
| 5,509,202 A | 4/1996 | Abdow |
| 5,517,592 A | 5/1996 | Grajewski et al. |
| 5,528,718 A | 6/1996 | Ray et al. |
| 5,657,413 A | 8/1997 | Ray et al. |
| 5,666,453 A | 9/1997 | Dannenmann |
| 5,684,911 A | 11/1997 | Burgett |
| 5,696,864 A | 12/1997 | Smith et al. |
| 5,734,776 A | 3/1998 | Puetz |
| 5,767,448 A | 6/1998 | Dong |
| 5,778,122 A | 7/1998 | Giebel et al. |
| 5,823,646 A | 10/1998 | Arizpe et al. |
| 5,825,963 A | 10/1998 | Burgett |
| 5,892,870 A | 4/1999 | Fingler et al. |
| 5,945,633 A | 8/1999 | Ott et al. |
| 5,969,294 A | 10/1999 | Eberle et al. |
| 5,997,186 A | 12/1999 | Huynh et al. |
| RE36,592 E | 2/2000 | Giebel et al. |
| 6,104,846 A | 8/2000 | Hodgson et al. |
| RE37,028 E | 1/2001 | Cooke et al. |
| 6,181,861 B1 | 1/2001 | Wenski et al. |
| 6,215,930 B1 | 4/2001 | Estes et al. |
| 6,255,584 B1 | 7/2001 | Renaud |
| 6,376,774 B1 | 4/2002 | Oh et al. |
| 6,407,338 B1 | 6/2002 | Smith |
| 6,466,725 B2 | 10/2002 | Battey et al. |
| 6,493,500 B1 | 12/2002 | Oh et al. |
| 6,539,160 B2 | 3/2003 | Battey et al. |
| 6,579,014 B2 | 6/2003 | Melton et al. |
| 6,619,697 B2 | 9/2003 | Griffioen et al. |
| 6,621,975 B2 | 9/2003 | Laporte et al. |
| 6,648,520 B2 | 11/2003 | McDonald et al. |
| 6,655,016 B2 | 12/2003 | Renaud |
| 6,668,127 B1 | 12/2003 | Mahony |
| 6,706,968 B2 | 3/2004 | Yaworski et al. |
| 6,764,220 B2 | 7/2004 | Griffiths et al. |
| 6,810,194 B2 | 10/2004 | Griffiths et al. |
| 6,819,842 B1 | 11/2004 | Vogel et al. |
| 6,856,748 B1 | 2/2005 | Elkins, II et al. |
| 6,880,219 B2 | 4/2005 | Griffioen et al. |
| 6,973,719 B1 * | 12/2005 | Patel et al. .................. 29/846 |
| 7,006,739 B2 | 2/2006 | Elkins, II et al. |
| 7,016,592 B2 | 3/2006 | Elkins, II et al. |
| 2004/0074852 A1 | 4/2004 | Knudsen et al. |
| 2004/0228589 A1 | 11/2004 | Melton et al. |
| 2004/0247265 A1 | 12/2004 | Takano et al. |
| 2005/0053342 A1 | 3/2005 | Melton et al. |
| 2005/0069275 A1 | 3/2005 | Brants et al. |
| 2005/0111799 A1 | 5/2005 | Cooke et al. |
| 2005/0111800 A1 | 5/2005 | Cooke et al. |
| 2005/0175308 A1 | 8/2005 | Elkins, II et al. |
| 2005/0259928 A1 | 11/2005 | Elkins, II et al. |
| 2005/0259929 A1 | 11/2005 | Elkins, II et al. |
| 2005/0259930 A1 | 11/2005 | Elkins, II et al. |
| 2005/0276552 A1 | 12/2005 | Cooke et al. |
| 2006/0056782 A1 | 3/2006 | Elkins, II et al. |
| 2006/0093278 A1 | 5/2006 | Elkins, II et al. |

FOREIGN PATENT DOCUMENTS

| | | |
|---|---|---|
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |
| JP | 62-54204 | 3/1987 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| JP | 2001-116968 | 4/2001 |
| WO | WO 2005/119322 | 12/2005 |
| WO | WO 2006/044080 | 4/2006 |
| WO | WO 2006/071412 A1 | 7/2006 |

OTHER PUBLICATIONS

"DAM/BLOK™ Electrical Splice Kit," http://www.pmiind.com/products/damblok.html, 2 pages (Copyright 2000).

"Factory Installed Termination Systems for Fiber Optic Cable Splices," 1 page (admitted as prior art as of the filing date).

"Installation Instructions for Pre-Connectorized MIC® Cable (2-6 Fiber) Equipped with Plug & Play™ Systems Pulling Grips," *Corning Cable Systems*, Issue 7, pp. 1-3 (Jul. 2001).

"Pre-Connectorized (4-24 Fiber) Fiber Optic Cables Equipped with Plug & Play™ Systems Pulling Sleeves and Grips," *Corning Cable Systems*, Issue 1, pp. 1-7 (Mar. 2005).

International Search Report and Written Opinion mailed Aug. 18, 2008.

* cited by examiner

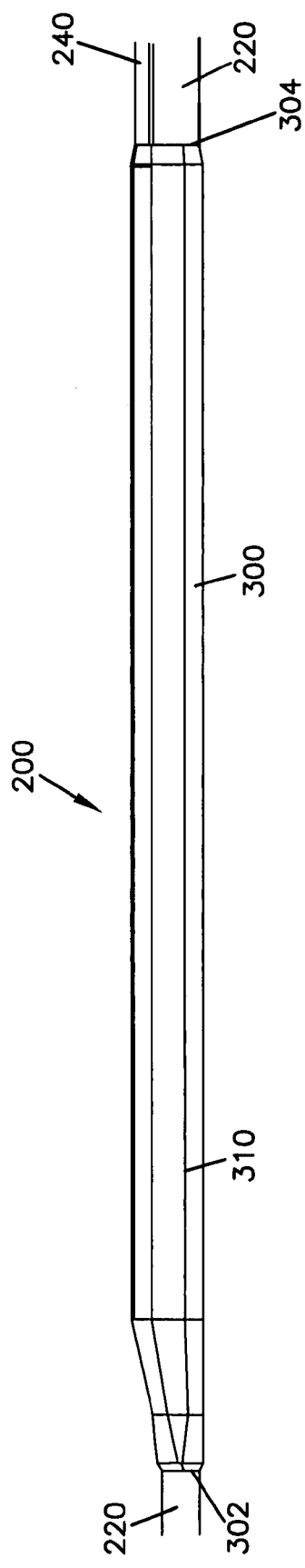
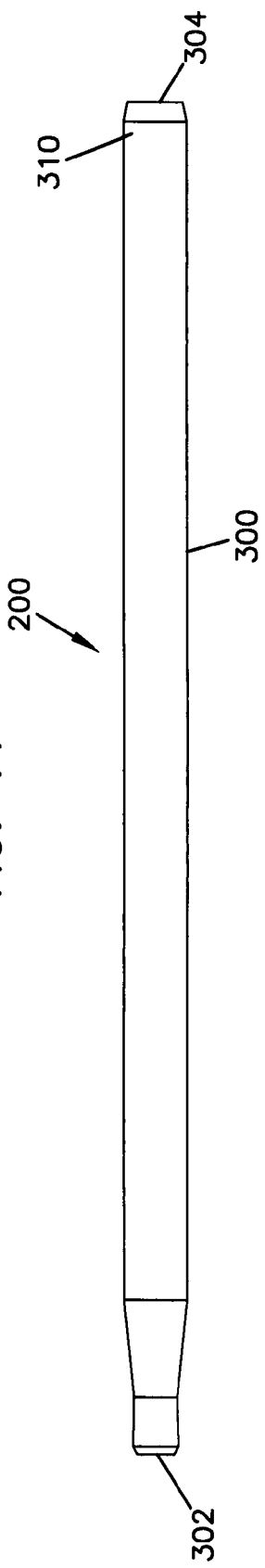

POLYURETHANE TO POLYETHYLENE ADHESION PROCESS

TECHNICAL FIELD

The principles disclosed herein relate to fiber optic cable systems. More particularly, the present disclosure relates to fiber optic cable systems having breakout arrangements protecting branch cables broken out from main cables.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown in FIG. 1, the network 100 may include a central office 110 that connects a number of end subscribers 115 (also called end users 115 herein) in a network. The central office 110 may additionally connect to a larger network such as the Internet (not shown) and a public switched telephone network (PSTN). The network 100 may also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network can be aerial or housed within underground conduits (e.g., see conduit 105).

The portion of network 100 that is closest to central office 110 is generally referred to as the F1 region, where F1 is the "feeder fiber" from the central office. The F1 portion of the network may include a distribution cable having on the order of 12 to 48 fibers; however, alternative implementations may include fewer or more fibers. The portion of network 100 that includes an FDH 130 and a number of end users 115 may be referred to as an F2 portion of network 100. Splitters used in an FDH 130 may accept a feeder cable having a number of fibers and may split those incoming fibers into, for example, 216 to 432 individual distribution fibers that may be associated with a like number of end user locations.

Referring to FIG. 1, the network 100 includes a plurality of breakout locations 125 at which branch cables (e.g., drop cables, stub cables, etc.) are separated out from main cables (e.g., distribution cables). Breakout locations can also be referred to as tap locations or branch locations and branch cables can also be referred to as breakout cables. At a breakout location, fibers of the branch cables are typically spliced to selected fibers of the main cable. However, for certain applications, the interface between the fibers of the main cable and the fibers of the branch cables can be connectorized.

Stub cables are typically branch cables that are routed from breakout locations to intermediate access locations such as a pedestals, drop terminals or hubs. Intermediate access locations can provide connector interfaces located between breakout locations and subscriber locations. A drop cable is a cable that typically forms the last leg to a subscriber location. For example, drop cables are routed from intermediate access locations to subscriber locations. Drop cables can also be routed directly from breakout locations to subscriber locations hereby bypassing any intermediate access locations Branch cables can manually be separated out from a main cable in the field using field splices. Field splices are typically housed within sealed splice enclosures. Manual splicing in the field is time consuming and expensive.

As an alternative to manual splicing in the field, pre-terminated cable systems have been developed. Pre-terminated cable systems include factory integrated breakout locations manufactured at predetermined positions along the length of a main cable (e.g., see U.S. Pat. Nos. 4,961,623; 5,125,060; and 5,210,812). However, the installation of pre-terminated cables can be difficult. For example, for underground applications, pre-terminations can complicate passing pre-terminated cable through the underground conduit typically used to hold fiber optic cable (e.g., 1.25 inch inner diameter conduit). Similarly, for aerial applications, pre-terminations can complicate passing pre-terminated cable through aerial cable retention loops.

SUMMARY

Certain aspects of the disclosure relate to a breakout process for pre-terminating branch cables to fiber optic distribution cables.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 10 is a side view of an enclosure installed at breakout location according to one embodiment of the present disclosure;

FIG. 11 is a top view of the enclosure of FIG. 10;

DETAILED DESCRIPTION

The present disclosure relates to mid-span breakout arrangements provided on distribution cables and methods for providing the breakout arrangements. Each breakout arrangement is provided at a breakout location to protect the optical coupling of a tether (i.e., a branch cable) to a distribution cable.

Figure 1:
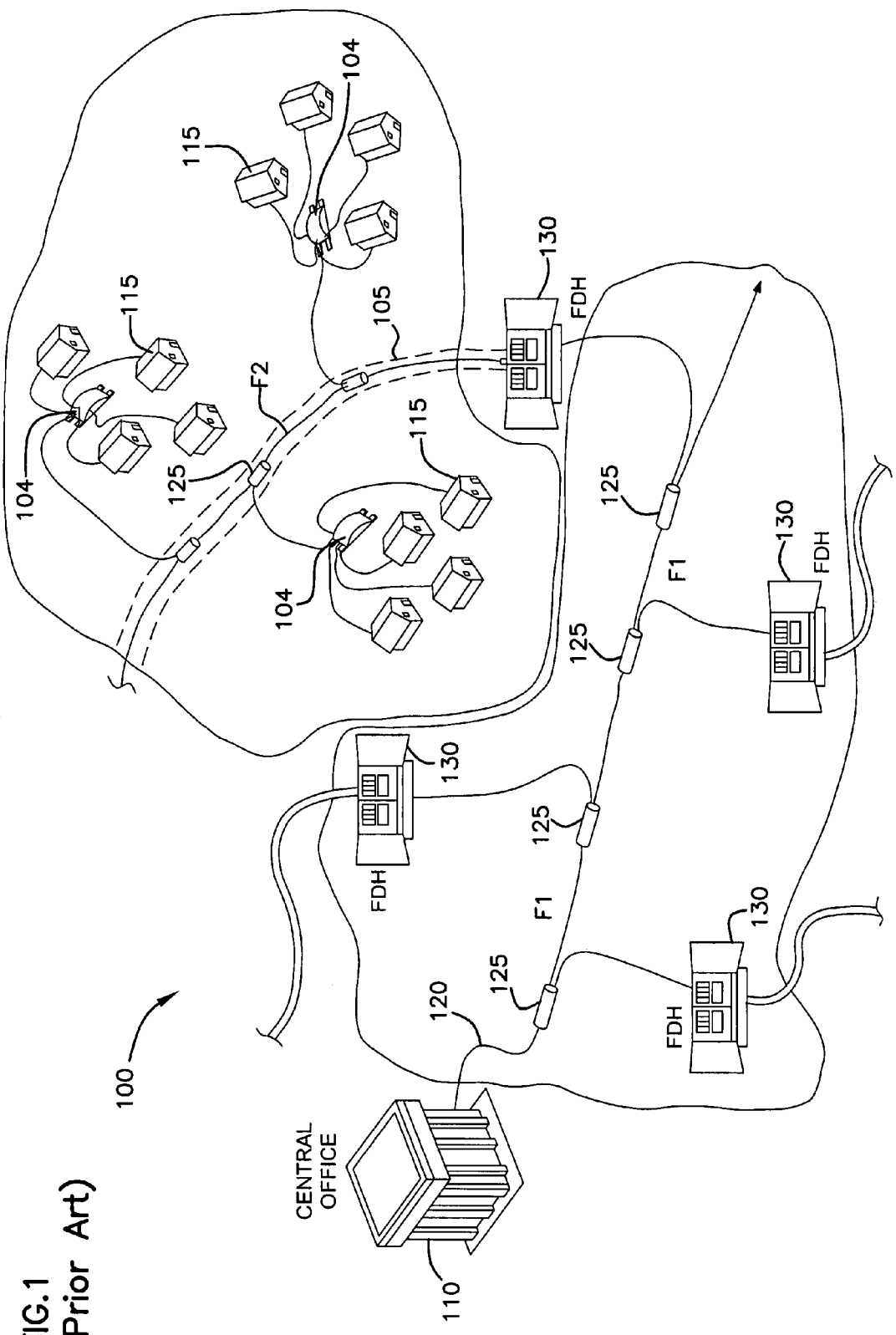
FIG. 1 shows a prior art passive fiber optic network.
Figure 2:
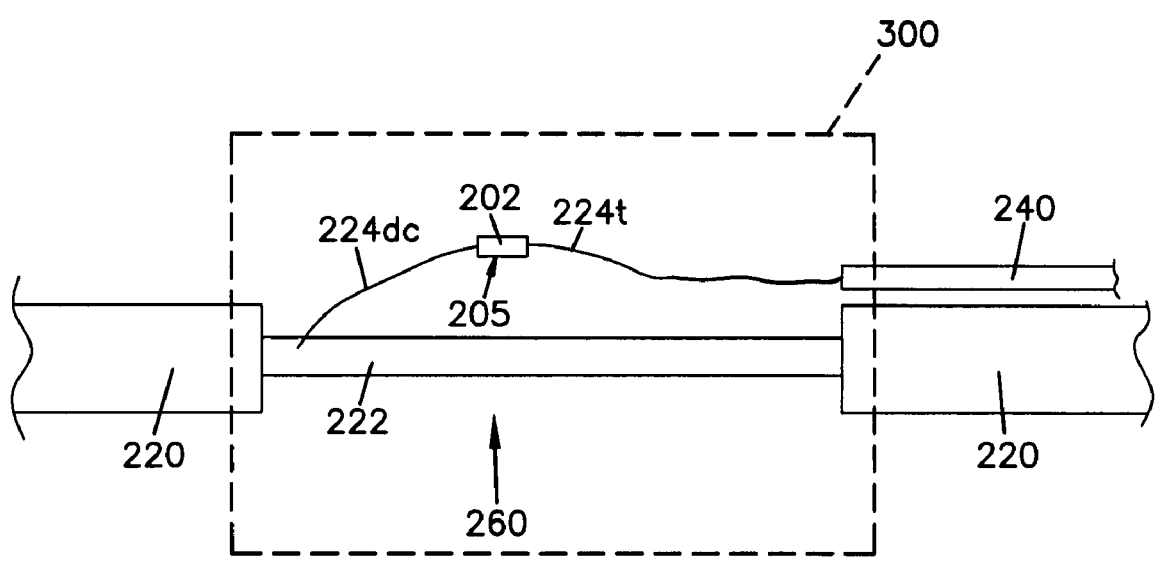
FIG. 2 is a side view of a tether branching from a distribution cable.

Referring now to the figures in general, a typical breakout location 260 is provided at an intermediate point along the length of a distribution cable 220 (e.g., see FIG. 2). At the breakout location 260, a fiber $224_t$ of a tether 240 is optically coupled to a fiber $224_{dc}$ of the distribution cable 220 at a coupling location 205. An enclosure 300 (e.g., an overmold) is typically provided around the distribution cable 220 and the tether 240 at the breakout location 260 to protect the optical fibers 224.

Figure 3:
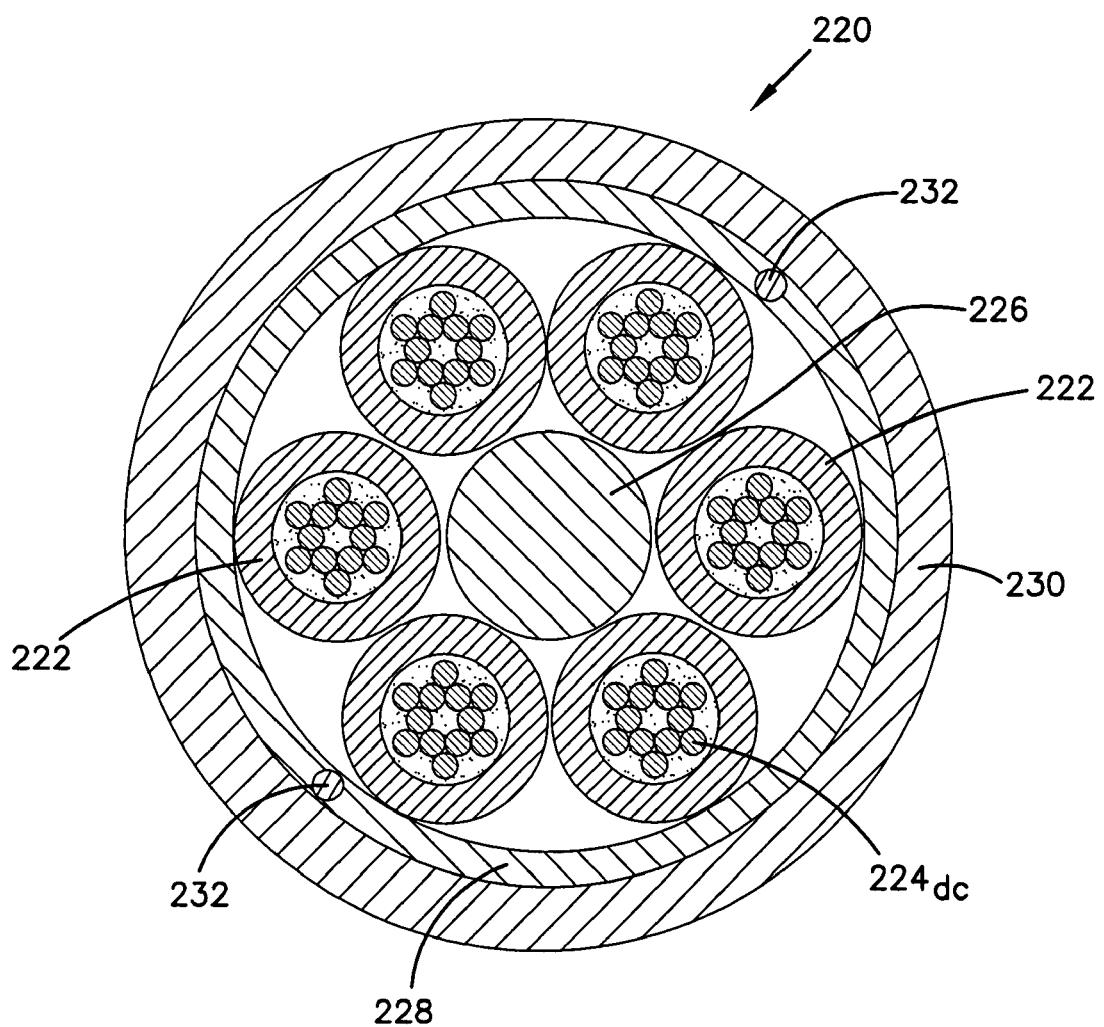
FIG. 3 is a cross sectional view of an example distribution cable.

FIG. 3 shows an example distribution cable 220 including six separate buffer tubes 222 each containing twelve fibers $224_{dc}$. The buffer tubes 222 may be gel filled. The distribution cable 220 also includes a central strength member 226 for reinforcing the cable 220, and an outer strength layer/member 228, such as aramid fiber/yarn (e.g., Kevlar® fiber), also for reinforcing the cable. The distribution cable 220 further includes an outer jacket 230 that encloses the buffer tubes 222. Ripcords 232 can be provided for facilitating tearing away portions of the jacket 230 to access the fibers $224_{dc}$ within the jacket 230. A typical distribution cable includes a relatively large number of fibers (e.g., 72, 144 or more fibers). The fibers are typically segregated into separate groups with each group contained within a separate buffer tube. The fibers within each buffer tube can include either ribbon fibers or loose fibers.

The various aspects of the present disclosure are also applicable to distribution cables having fewer numbers of fibers (e.g., two or more fibers). For example, the distribution cable can include an outer jacket enclosing a single buffer tube and at least two strength members extending on opposite sides of the single buffer tube (not shown). An outer strength layer/member, such as aramid fiber/yarn, can surround the single buffer tube within the jacket. The single buffer tube can enclose loose fibers or ribbon fibers.

Figure 4:
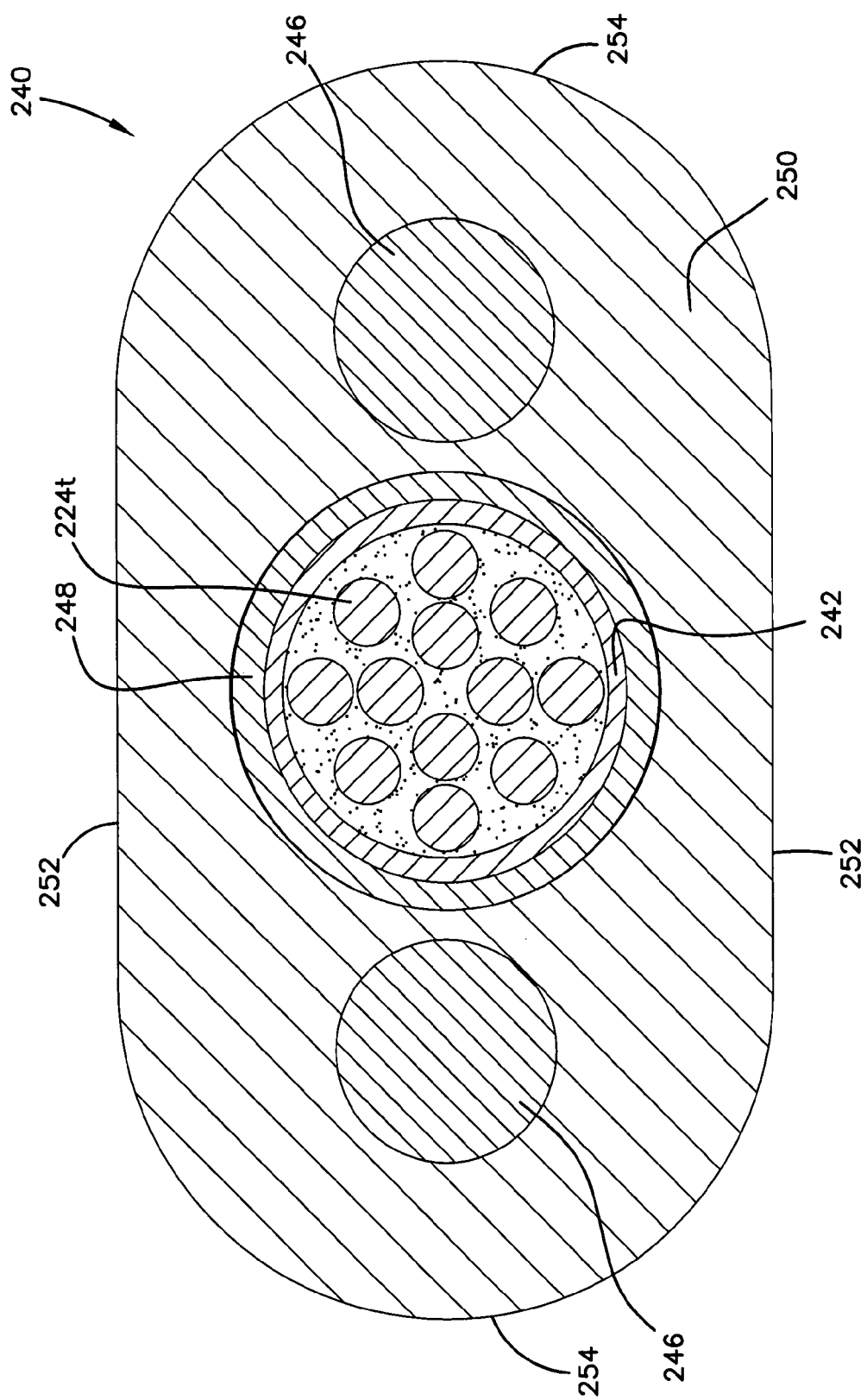
FIG. 4 is a cross sectional view of an example tether.

FIG. 4 illustrates an example tether 240 configured to join to the distribution cable 220 at the breakout location 260. The tether 240 includes a central buffer tube 242 containing multiple fibers $224_t$ (e.g., typically one to twelve loose or ribbonized fibers). Strength members 246 (e.g., flexible rods formed by glass fiber reinforced epoxy) are positioned on opposite sides of the central buffer tube 242. An outer jacket 250 surrounds the strength members 246 and the buffer tube 242. An additional strength layer 248 (e.g., aramid fiber/yarn) can be positioned between the buffer tube 242 and the outer jacket 250. In the example shown, the tether 240 is depicted as having a flat cable configuration. The outer jacket 250 includes an outer perimeter having an elongated transverse cross-sectional shape. The transverse cross-sectional shape includes oppositely positioned, generally parallel sides 252 interconnected by rounded ends 254. However, any suitable cable configuration can be utilized for both the distribution cable and the tether cable.

Figure 5:
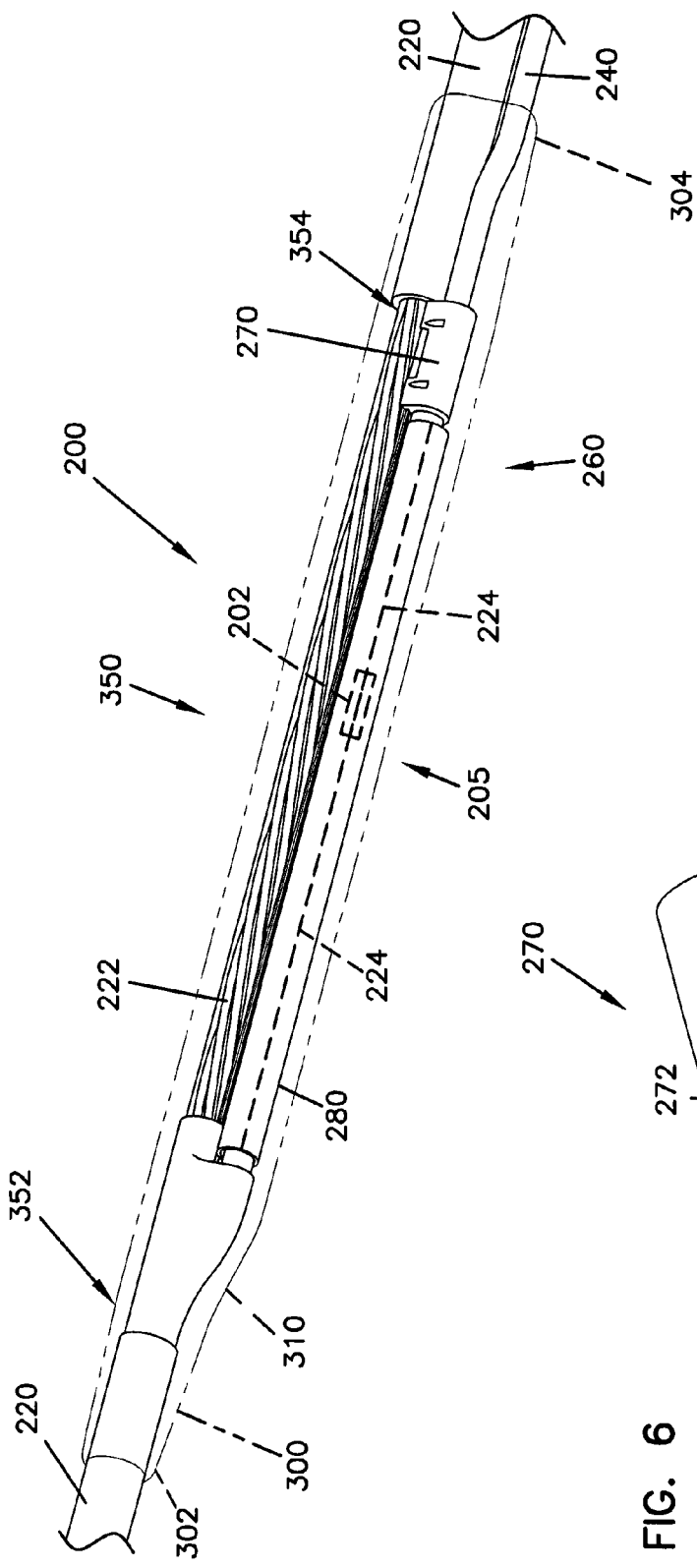
FIG. 5 is a perspective view of an example breakout assembly installed on a distribution cable at breakout location.

Referring now to FIG. 5, one or more tether fibers (e.g., typically less than twelve fibers) $224_t$ are preferably optically coupled (e.g., spliced) at a coupling location 205 to selected fibers $224_{dc}$ of the distribution cable 220 extending from one of the exposed buffer tubes 222. For clarity, only a single tether fiber $224_t$ and distribution cable fiber $224_{dc}$ are shown coupled together in the figures. The opposite ends of the tether fibers $224_t$ are configured to optically couple to a drop terminal or other type of telecommunications equipment (not shown) offset from the breakout location 260. For example, the tether 240 can terminate in one or more fiber optic connectors (not shown).

A breakout assembly 200 having features that are examples of inventive aspects in accordance with the principles of the present disclosure is shown installed on a distribution cable in FIG. 5. The breakout assembly 200 includes a sleeve 202 mounted over the optical fibers $224_t$, $224_{dc}$ at the coupling location 205. An optional protective tube 280 can also be provided over the fibers $224_t$, $224_{dc}$ and the sleeve 202. An enclosure 300 surrounds the coupled optical fibers $224_{dc}$, $224_t$, the sleeve 202, the optional tube 280, and the exposed buffer tubes 222 of the distribution cable 220.

In general, the enclosure 300 has a body 310 that protects the optical connection between the tether 240 and the distribution cable 220. One end 302 of a body 310 of the enclosure 300 extends over the distribution cable 220 adjacent a first end 352 of the stripped region 350 and the other end 304 of the body 310 extends over the tether cable 240 and the distribution cable 220 adjacent a second end 354 of the stripped region 350. The tether 240 generally extends outwardly a length from the enclosure 300 to a connection end 256. The enclosure 300 can include an overmold.

When the tether 240 is secured to the distribution cable 220, the tether 240 should preferably be able to withstand a pullout force of at least one hundred pounds. To meet this pullout force requirement, the breakout assembly 200 also can includes a retention block 270 (see FIG. 6) configured to strengthen the mechanical interface between the tether 240 and the distribution cable 220. Typically, the retention block 270 is enclosed within the protective enclosure 300.

Figure 6:
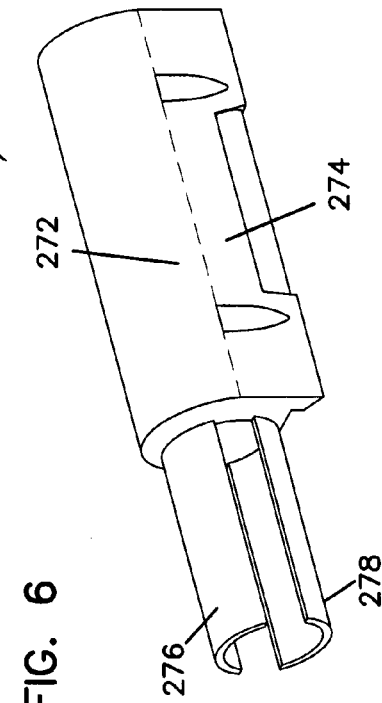
FIG. 6 is a perspective view of an example retention block used at the breakout location of FIG. 5.

As shown at FIG. 6, the retention block 270 includes a base 274 and a cover 272 between which the fiber $224_t$ of the tether 240 extends. First and second protrusions 276, 278 extend from the cover 272 and base 274, respectively. In one embodiment, the retention block 270 has a polycarbonate construction. Further details regarding the retention block 270 can be found in U.S. provisional application Ser. No. 60/781,280, filed Mar. 9, 2006, and entitled "FIBER OPTIC CABLE BREAKOUT CONFIGURATION," the disclosure of which is hereby incorporated by reference.

It is preferred for the fibers $224_t$ of the tether to be preterminated to the fibers $224_{dc}$ of the distribution cable. "Preterminated" means that the tether fibers $224_t$ are fused or otherwise connected to the fibers $224_{dc}$ of the distribution cable 220 at the factory as part of the cable manufacturing process rather than being field terminated. The remainder of the breakout assembly 200 is also preferably factory installed.

Figure 7:
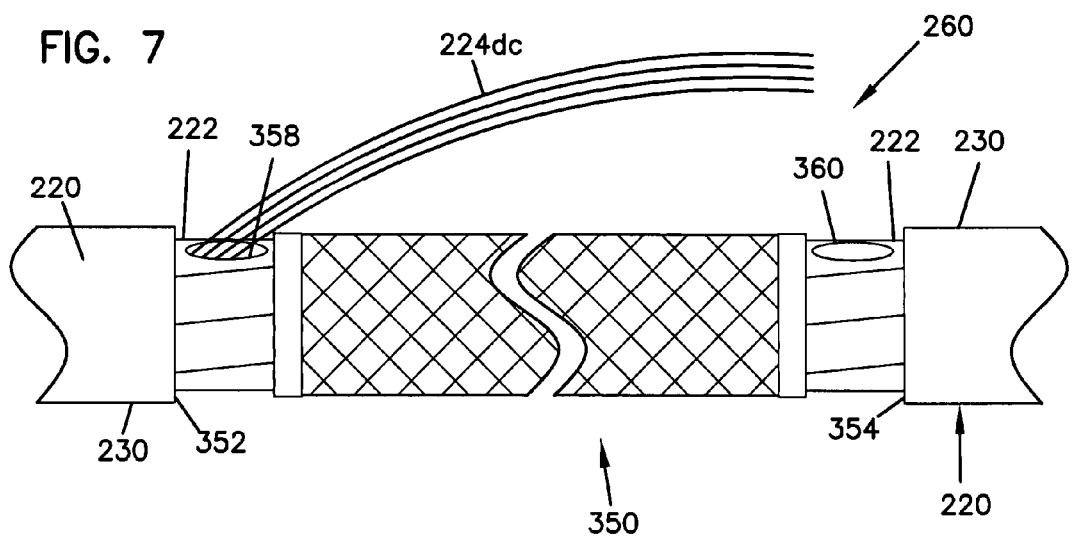
FIG. 7 shows an initial preparation of the distribution cable at the breakout location of FIG. 5.
Figure 8:
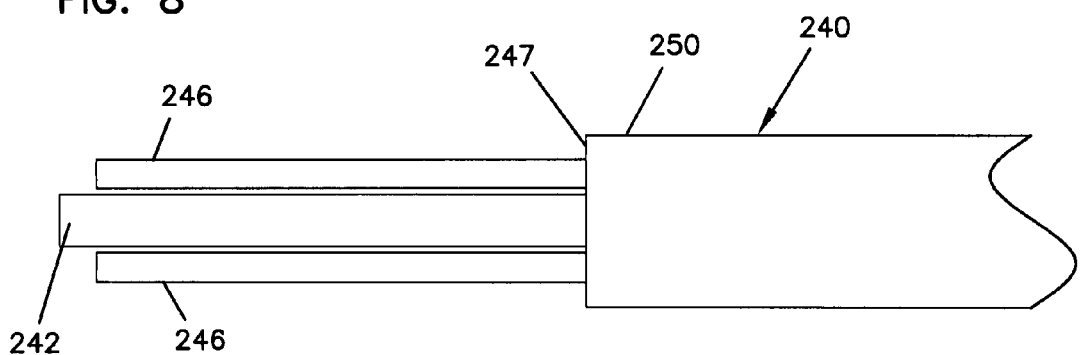
FIG. 8 shows a first preparation step for a tether used at the breakout location of FIG. 5.
Figure 9:
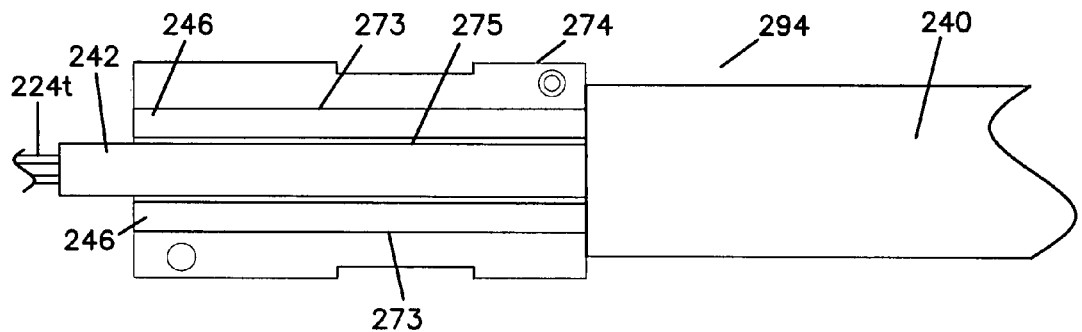
FIG. 9 shows a subsequent preparation step for the tether of FIG. 8.

Referring to FIGS. 7-9, to prepare the breakout location 260 on the distribution cable 220, a portion of the outer jacket 230 is first stripped away to provide a stripped region 350 (FIG. 7). In certain embodiments, portions of a cable netting can be removed adjacent the first and second ends 352, 354, respectively, so that the buffer tubes 222 are exposed (FIG. 7). The outer strength layer/member 228 also can be displaced (e.g., bunched at one side of the cable 220) adjacent the ends 352, 354 to facilitate accessing the buffer tubes 222 (see, e.g., FIG. 5). Tape can be used to prevent the intermediate length of netting that remains at the breakout location 260 from unraveling (FIG. 7).

One of the buffer tubes 222 is selected and a first window 358 is cut into the selected buffer tube 222 adjacent the first end 352 of the stripped region 350 and a second window 360 is cut into the selected buffer tube 222 adjacent the second end 354 of the stripped region 350 (FIG. 7). The fibers $224_{dc}$ desired to be broken out are accessed and severed at the second window 360. After the fibers $224_{dc}$ have been severed, the fibers $224_{dc}$ are pulled from the buffer tube 222 through the first window 358. With the distribution cable 220 prepared as shown in FIG. 7, the fibers $224_{dc}$ are ready to be terminated to one or more fibers $224_t$ of a prepared tether 240.

To prepare the tether 240 to be installed on the prepared distribution cable 220, a portion of the outer jacket 250 is stripped away to expose the central buffer tube 242 and the strength members 246 (see FIG. 8). As shown at FIG. 8, the central buffer tube 242 and the strength members 246 project outwardly beyond an end 247 of the outer jacket 250. The strength layer 248 (FIG. 4) is removed from around the buffer tube 242. After removing the end portion of the outer jacket 250, the strength members 246 are trimmed as shown at FIG. 8, and an end portion of the central buffer tube 242 is removed to expose the fibers $224_t$ (FIG. 9).

To connect the tether fibers $224_t$ to the distribution cable fibers $224_{dc}$, the sleeve 202 (FIG. 5) is first slid over the fibers $224_t$ of the tether. In certain embodiments, the sleeve 202 can be slid up over the buffer tube 242 of the tether 240. The optional protective tube 280 (FIG. 5) also can be slid over the tether 240. When the sleeve 202 and protective tube 280 are mounted on the tether 240, the fibers $224_t$ of the tether 240 are coupled (e.g., fused) to the fibers $224_{dc}$ of the distribution cable 220. After the coupling process is complete, the sleeve 202 can be slid over the coupling location 205 to protect the fused fibers $224_t$, $224_{dc}$. The tube 280 can be slid over the sleeve 202. The fibers are then tested to confirm that the fibers meet minimum insertion loss requirements.

If desired, the tether 240 can be mounted to the retention block 270. For example, as shown at FIG. 9, the strength members 246 can be positioned within side grooves 273 on the base 274 of the retention block 270, and the central buffer tube 242 can be inserted within a central groove 275 on the base 274. In the example illustrated, the central buffer tube 242 has a length that extends beyond a first end of the base 274, and the strength members 246 have lengths that terminate generally at the first end of the base 274. After securing the retention block 270 to the distribution cable 220, one end of the optional protective tube 280 can be mounted over the protrusions 276, 278 of the retention block 270 (see FIG. 5).

After verifying insertion loss, heat resistant tape is wrapped around the distribution cable 220, the tether 240, and the breakout location assembly 200. Thereafter, the enclosure 300 is applied over the taped breakout location 260 (see FIGS. 10-11). The enclosure (e.g., an overmold layer) 300 seals and protects the underlying components of the breakout assembly 200. The tether 240 extends outwardly from the body 310 of the enclosure 300 to tether connectors (not shown) spaced from the enclosure body 310.

Figure 12:
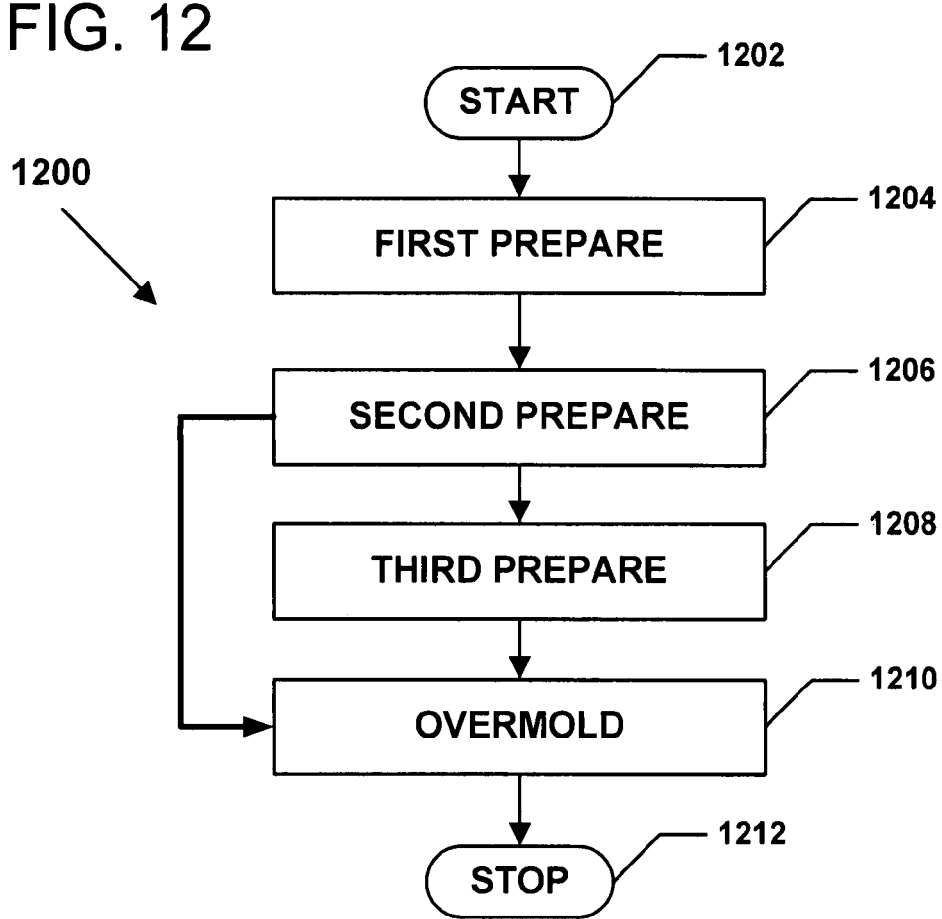
FIG. 12 is a flowchart illustrating an example installation process for installing an enclosure over a breakout assembly according to one embodiment of the present disclosure.

Referring now to FIG. 12, the enclosure 300 is installed over the breakout assembly 200 by securing the ends 302, 304 of the enclosure body 310 to the distribution cable 220. The ends 302, 304 of the enclosure body 310 also can be secured to the tether 240. FIG. 12 illustrates a flowchart depicting an installation process 1200 for installing the enclosure body 310. The installation process 1200 begins at start module 1202 and proceeds to a first prepare operation 1204.

Figure 13:
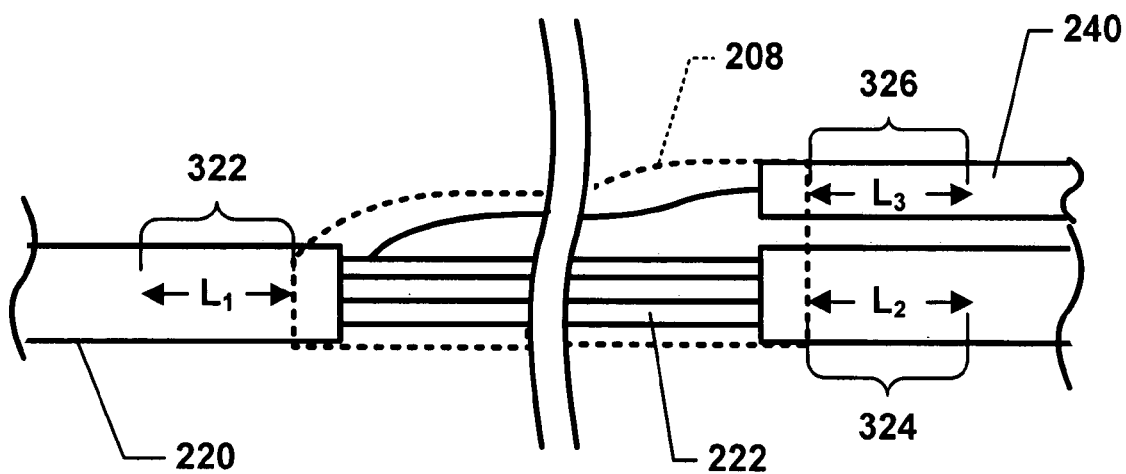
FIG. 13 is a schematic view of a telecommunications cable including a tether branching from a distribution cable.

The first prepare operation 1204 provides protection for the exposed buffer tubes 222 and coupled optical fibers $224_{dc}$, $224_t$ against the heat and other stresses associated with overmolding an enclosure. For example, heat resistant tape 208 (FIG. 13) can be wrapped around the buffer tubes 222 and coupled optical fibers $224_{dc}$, $224_t$. As shown in FIG. 13, the heat resistant tape 208 is wrapped from the distribution cable jacket 230 adjacent the first end 352 of the stripped region 350 (FIG. 5), around the breakout assembly 200 (FIG. 5), past the second end 354 of the stripped region 350, and over the distribution cable jacket 230 and tether jacket 250 at the second end 354 of the stripped region 350 (FIG. 5).

A second prepare operation 1206 provides regions of adhesion on the distribution cable 220 to which the enclosure body 310 can be secured. The process for providing the adhesion regions will be discussed herein with reference to FIGS. 14-17. In general, the adhesion regions 322, 324 are provided on the outer jacket 230 of the distribution cable 220. For example, as shown in FIG. 13, a first adhesion region 322 is typically provided on the distribution cable 220 adjacent the first end 352 of the stripped region 350 and a second adhesion region 324 is provided adjacent the second end 354 of the stripped region 350.

The adhesion regions 322, 324 have lengths $L_1$, $L_2$, respectively, that extend longitudinally along the distribution cable 220 (FIG. 13). In the example shown in FIG. 13, the first adhesion region 322 extends from a first end of the heat resistant tape 208 in a first direction extending generally away from the breakout location 206 (FIG. 5). The second adhesion region 324 extends from a second, opposite end of the tape 208 in a second, opposite direction generally away from the breakout location 206. Typically, the lengths $L_1$, $L_2$ of the adhesion regions 322, 324 extend about 1-4 inches, inclusive. Preferably, the lengths $L_1$, $L_2$ each extend about 2-3 inches.

An optional third prepare operation 1208 provides a region of adhesion on the tether 240 to which the enclosure body 310 also can be secured. For example, a third adhesion region 326 having a third length $L_3$ is shown in FIG. 13 extending over the outer jacket 250 of the tether 240. In general, the third prepare operation 1208 is substantially similar to the second prepare operation 1206. The third adhesion region 326, therefore, is generally similar to the adhesion regions 322, 324 provided on the distribution cable 220. Typically, the length $L_3$ of the third adhesion region 326 is substantially the same as the lengths $L_1$, $L_2$ of the adhesion regions 322, 324, respectively, of the distribution cable 220.

An overmold operation 1210 installs the enclosure body 310 over the breakout location 206 (FIG. 5) of the distribution cable 220. In general, the enclosure 310 encloses the distribution cable 220 and the breakout assembly 200. Typically, the enclosure 310 also encloses a portion of the tether 240. In the example shown, the first end 302 of the enclosure body 310 is formed around the first adhesion region 352 and the second end 304 of the enclosure body 310 is formed around the second adhesion region 354 and the third adhesion region 356. In some embodiments, the enclosure body 310 also can extend past the adhesion regions 352, 354, 356. The overmold operation 1210 is described in more detail with respect to FIG. 16.

Figure 14:
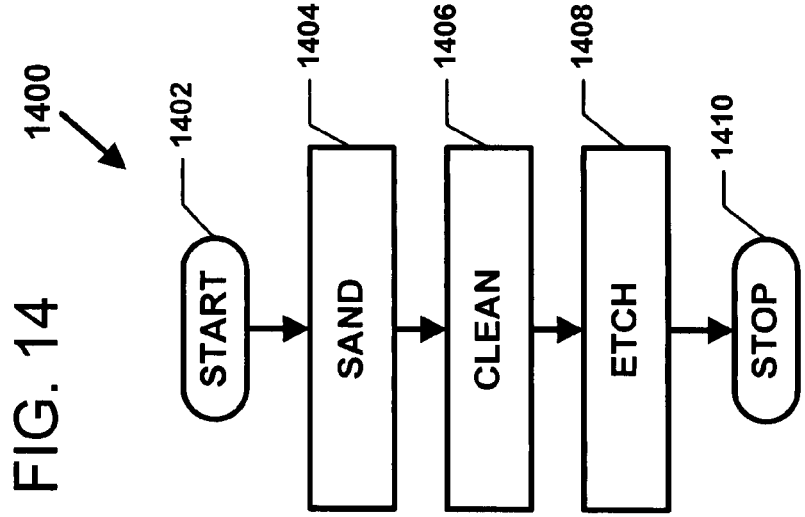
FIG. 14 is a flowchart illustrating an example treatment process for preparing a cable to bond with an enclosure body according to one embodiment of the present disclosure.
Figure 17:
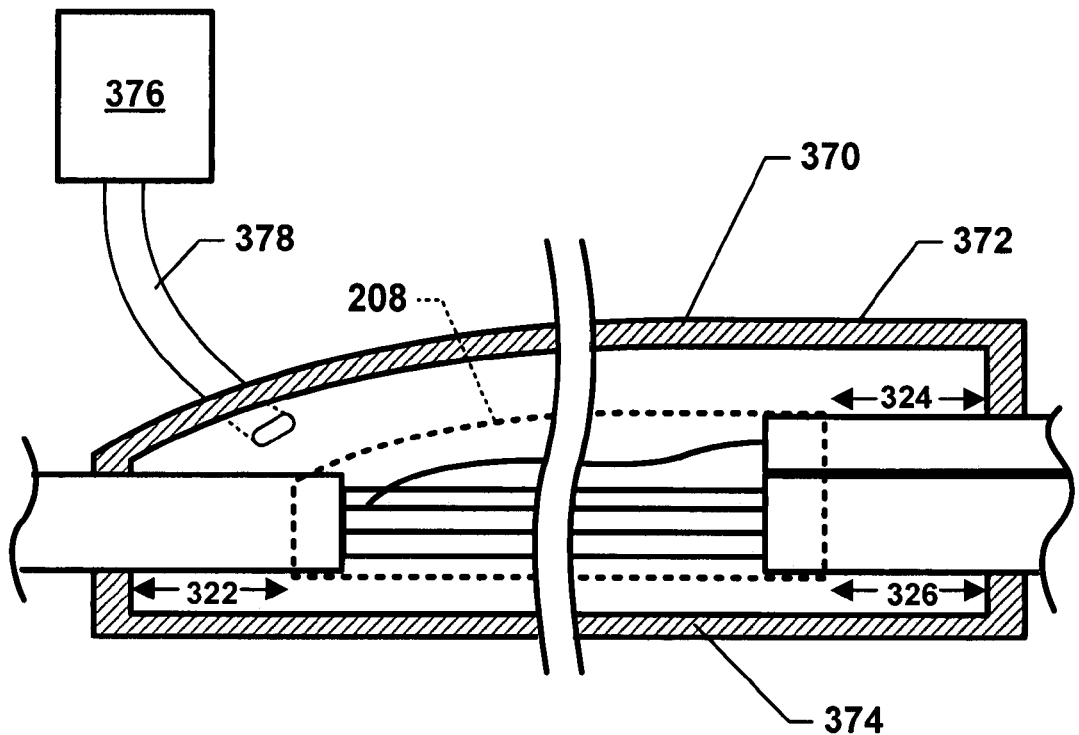
FIG. 17 is a cross-sectional, schematic view depicting a distribution cable and tether placed within molds during the overmolding process of FIG. 16.

FIG. 14 illustrates a flowchart depicting an example treatment process 1400 for providing enhanced adhesion between two materials, such as two polymeric materials. For example, the treatment process 1400 increases the adhesion between a polyurethane material and a polyethylene material. The treatment process 1400 can be used to prepare the outer jacket 230 of the distribution cable 220 to enable the enclosure body 310 to couple more securely to the outer jacket 230. For example, in preliminary testing, the treatment process 1400 has increased the pull out strength of a polyethylene cable from a polyurethane enclosure by 300%-400%. Optionally, the outer jacket 250 of the tether 240 can be prepared using substantially the same process.

The treatment process 1400 begins at start module 1402 and proceeds to a sand operation 1404. The sand operation 1404 roughens the circumferential surface of the outer jacket 230 at the first and second adhesion regions 322, 324. Generally, the outer jacket 230 along the regions 322, 324 is sanded with a grit ranging from about 40 to about 180, and more preferably ranging from about 60 to about 120. Preferably, the gritted material (e.g., sandpaper) is rubbed laterally across the cable 220. However, the cable 220 alternatively could be sanded along the longitudinal length of the cable 220.

A clean operation 1406 applies a cleaning agent to the sanded areas and then removes the excess cleaning agent. For example, alcohol (e.g., isopropyl alcohol) can be applied to the roughened surfaces of the outer jacket 230. The excess alcohol can be wiped away with a clean cloth. The clean operation 1406 can be performed anytime after the sand operation 1404.

An etch operation 1408 is performed after the clean operation 1404. In general, the etch operation 1408 is performed while the outer jacket 230 is still clean. It is believed that dirt or other contaminants can shield the outer jacket 230 from the full effects of the etching. Typically, the etch operation 1408 is performed within four minutes of the clean operation 1406 to inhibit contamination of the jacket 230 (e.g., from the environment). Preferably, the etch operation 1408 is performed within two minutes when not in a clean room environment.

Figure 15:
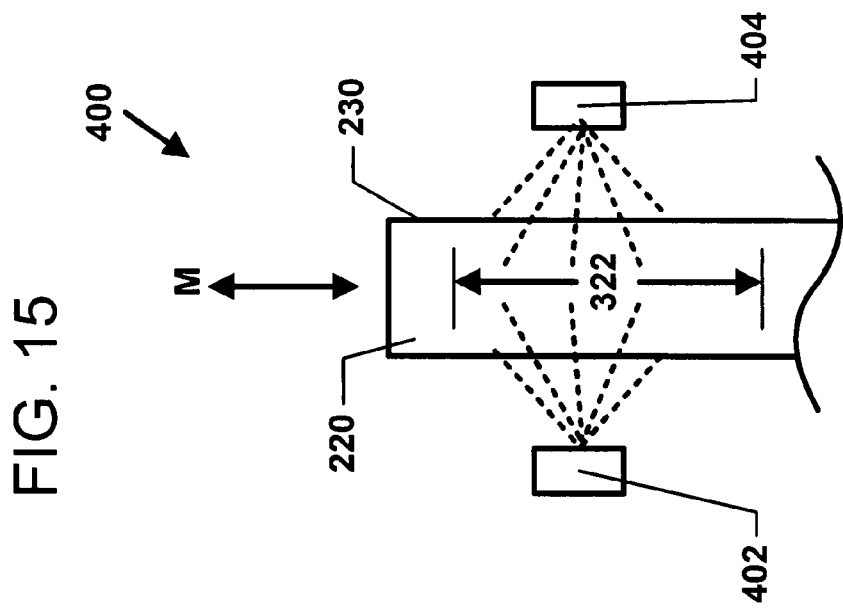
FIG. 15 is a schematic diagram showing respective movement of a cable relative to a plasma etcher during the treatment process of FIG. 14.

The etch operation 1408 increases the surface area of the adhesion regions 322, 324 by providing disruptions on the outer jacket 230 along the cleaned and sanded regions 322, 324. Typically, the etch operation 1408 is performed using a plasma etcher 400 (FIG. 15). One example of a suitable plasma etcher is the Flume™ system from Plasmatreat North America, Inc.

The plasma etcher 400 has at least a first head 402 (FIG. 15). Each head 402 is configured to emit a beam of plasma. In some embodiments, the beam of plasma is emitted in a ringed configuration. In other embodiments, a beam emitting nozzle (not shown) on the head 402 is configured to rotate in a circular pattern. In still other embodiments, however, the beam of plasma can be emitted from the head 402 in any desired configuration.

The cable 220 is positioned adjacent the first head 402 so that the plasma beam is directed at one of the adhesion regions 322, 324. Typically, the adhesion regions 322, 324 extend over a length that is greater than the diameter/width of the plasma beam. For example, the length of the adhesion region 322 is preferably about three inches and the diameter/width of the plasma beam is typically about one inch.

To etch the entire length of each adhesion region 322, 324, therefore, the cable 220 is moved back and forth along the length of each adhesion region 322, 324 along a longitudinal axis M of the cable 220. In some embodiments, to etch the entire circumference of each adhesion region 322, 324, the cable 220 is rotated at least partially about the longitudinal axis M. When one side of the cable 220 has been etched, the cable 220 can be flipped about 180° so that the etcher head 402 faces the opposite side of the cable 220. The etching operation 1408 can then be repeated for the opposite side.

In other embodiments, however, the plasma etcher 400 has a first head 402 and a second, opposing head 404 as shown in FIG. 15. The cable 220 is positioned between the opposing heads 402, 404 so that the plasma beams emitted from the heads 402, 404 contact both sides of the cable 220. If desired, the cable 220 can be moved along the longitudinal axis M as discussed above to increase the surface area with which the etcher 400 interacts. In addition, the cable 220 also can be rotated about the longitudinal axis M to etch the entire circumference of the cable 220. The treatment process 1400 ends at stop module 1410.

Figure 16:
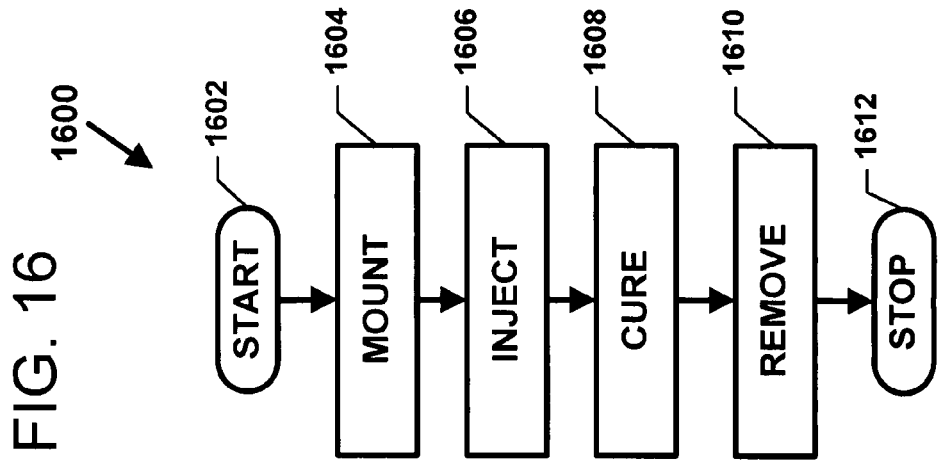
FIG. 16 is a flow chart illustrating an example overmolding process for forming the enclosure body according to one embodiment of the present disclosure.

FIG. 16 illustrates a flowchart depicting an example overmold process 1600 for overmolding a telecommunications cable. The overmold process 1600 is performed after the etch operation 1408 of the treatment process 1400. In general, care is taken to avoid contacting the treated (e.g., etched) cables 220, 240 with human hands. Preferably, the overmold process 1600 is performed within four minutes of the etch operation 1408 to mitigate the chances of contaminating (e.g., touching) the treated cables 220, 240. The overmold operation 1410 surrounds the distribution cable 220 at the breakout location 206 (FIG. 5) and the adhesion regions 322, 324, 326 of the cable jackets 230, 250 with an enclosure 300.

The overmold process 1600 begins at start module 1602 and proceeds to a mount operation 1604. In the mount operation 1604, the treated distribution cable 220 is placed in a mold 370. In the example shown in FIG. 17, the distribution cable 220 is placed within a mold 370 formed from a first member 372 and a second member 374. Other suitable molds 370 can also be used.

Polymeric material is introduced into the mold in inject operation 1606. The polymeric material is injected from a source 376, through a conduit 378, and into the mold 370 to cover portions of the distribution cable 220 including the treated adhesion regions 322, 324. Generally, the enclosure body 310 is formed of a different material than the outer jacket of the distribution cable 220. Typically, the enclosure body 310 is formed of Polyurethane and the outer jacket of the distribution cable 220 is formed from Polyethylene. In some embodiments, a portion of the tether 240 is placed into the mold 370 with the distribution cable 220 and the polymeric material is injected around the treated region 326 of the tether cable jacket 250.

Figure 18:
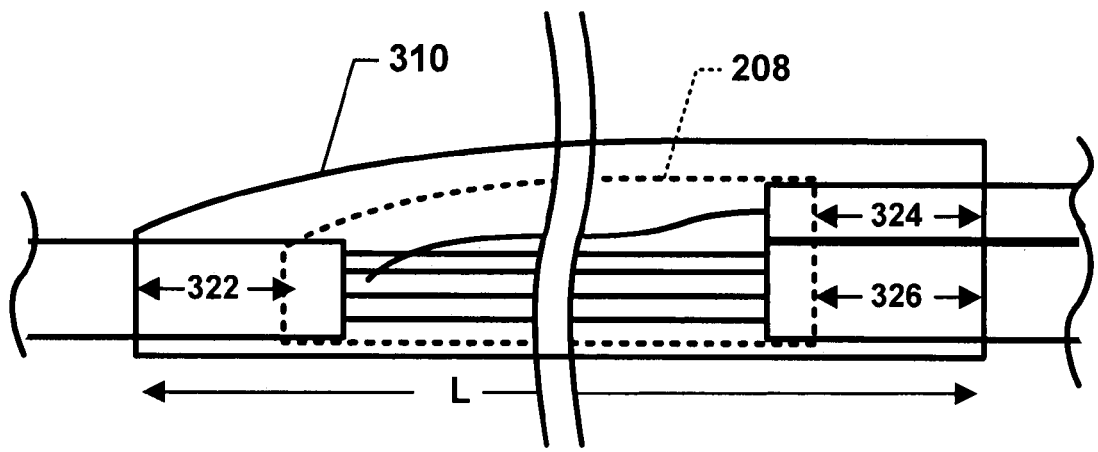
FIG. 18 is a schematic diagram depicting an enclosure overmolded over a breakout location on a distribution cable of FIG. 17.

A cure operation 1608 allows the polymeric material to harden. For example, the cure operation 1608 can allow the polymeric material time to cool. A remove operation 1610 removes the distribution cable 220 from the mold 370. The hardened polymeric material remains secured around the distribution cable 220 to form an enclosure body 310 (FIG. 18). The overmold process 1600 ends at stop module 1612.

It is preferred for the enclosure body 310 to be sized with a cross sectional shape sufficient to allow the breakout location 260 to be readily passed through a one and one-half inch inner diameter conduit or a one and one-quarter inch diameter conduit. In certain embodiments, the breakout location 260 has a cross sectional area that can be passed through a one inch inner diameter conduit.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for treating a telecommunications cable, the method comprising:
   selecting a first area on the telecommunications cable, the first area extending partially along a first length of the telecommunications cable and circumferentially around the telecommunications cable;
   sanding a first surface of the first area to provide a first roughened surface;
   cleaning the first roughened surface with a cleaning agent to provide a first cleaned surface;
   etching disruptions in the first cleaned surface to form a first treated surface; and
   forming an enclosure over the telecommunications cable, at least a portion of the enclosure contacting the first treated surface of the telecommunications cable.

2. The method of claim 1, wherein forming an enclosure comprises forming the enclosure from a polymeric material.

3. The method of claim 2, wherein forming an enclosure comprises forming the enclosure from polyurethane.

4. The method of claim 1, wherein the first area of the telecommunications cable is formed from polyethylene.

5. The method of claim 1, wherein cleaning comprises applying the cleaning agent to the first roughened surface and wiping excess cleaning agent from the first roughened surface.

6. The method of claim 1, wherein the cleaning agent comprises isopropyl alcohol.

7. The method of claim 1, wherein etching disruptions is performed less than four minutes after cleaning the first roughened surface.

8. The method of claim 1, wherein etching disruptions is performed with a plasma-etcher.

9. The method of claim 1, wherein forming the enclosure is performed less than four minutes after etching disruptions.

10. The method of claim 1, further comprising:
    selecting a second area on the telecommunications cable, the second area extending partially along a second length of the telecommunications cable;
    sanding a surface of the second area to provide a second roughened surface;
    cleaning the second roughened surface with a cleaning agent to provide a second cleaned surface; and
    etching disruptions in the second cleaned surface to form a seconded treated surface.

11. The method of claim 10, wherein the first length is less than four inches and the second length is substantially equal to the first length.

12. The method of claim 11, wherein the first length is about three inches.

13. A method for overmolding a section of a telecommunications cable, the method comprising:
    selecting a first area on the telecommunications cable, the first area extending partially along a length of the telecommunications cable and circumferentially around the telecommunications cable;
    sanding a first surface of the first area to provide a first roughened surface;
    cleaning the first roughened surface with alcohol to provide a first cleaned surface;
    etching disruptions in the first cleaned surface to form a first treated surface;
    mounting the first treated surface in a mold;
    injecting a liquid polymeric material into the mold to cover the first treated surface;
    allowing the polymeric material to harden; and
    removing the mold to leave the hardened polymeric material around the first treated surface.

14. The telecommunications cable of claim 13, wherein the polymeric material is polyurethane.

15. The telecommunications cable of claim 13, wherein the first area of the telecommunications cable is formed from polyethylene.

16. The method of claim 13, further comprising:
    selecting a second area on the telecommunications cable;
    sanding a surface of the second area to provide a second roughened surface;
    cleaning the second roughened surface with alcohol to provide a second cleaned surface;
    etching disruptions in the second cleaned surface to form a seconded treated surface; and
    mounting the second treated surface in the mold, wherein the liquid polymeric material injected into the mold also cover the second treated surface; and the hardened polymeric material surrounds the second treated surface.

17. A method for preterminating a tether to a distribution cable, the method comprising:
    coupling at least a first fiber of a tether to a first fiber of a distribution cable at a breakout location on the distribution cable;
    selecting a first area on the distribution cable, the first area located at a first end of the breakout location, the first area having a first surface;
    selecting a second area on the distribution cable, the second area located at a second, opposite end of the breakout location, the second area having a second surface;
    sanding the first surface of the first area to provide a first roughened surface;
    sanding the second surface of the second area to provide a second roughened surface;
    cleaning the first roughened surface with a cleaning agent to provide a first cleaned surface;
    cleaning the second roughened surface with the cleaning agent to provide a second cleaned surface;
    etching disruptions in the first cleaned surface to form a first treated surface;
    etching disruptions in the second cleaned surface to form a second treated surface; and
    forming an enclosure over the breakout location on the distribution cable, at least a first portion of the enclosure contacting the first treated surface of the distribution cable and at least a second portion of the enclosure contacting the second treated surface of the distribution cable.

18. The method of claim 17, wherein the enclosure if formed from polyurethane.

19. The method of claim 17, wherein the first area of the distribution cable is formed from polyethylene.

20. The method of claim 17, further comprising installing a breakout assembly on the distribution cable to protect the first fiber of the tether and the first fiber of the distribution cable, the enclosure also surrounding the breakout assembly.

21. The method of claim 17, wherein the enclosure is formed on the distribution cable in a factory prior to field installation.

22. The method of claim 17, further comprising:
    selecting a third area on the tether, the third area located adjacent the second end of the breakout location on the distribution cable;
    sanding a surface of the third area to provide a third roughened surface;

cleaning the third roughened surface with a cleaning agent to provide a third cleaned surface; and etching disruptions in the third cleaned surface to form a third treated surface, wherein at least a portion of the enclosure contacts the third treated surface of the tether.

23. A method for providing enhanced adhesion between a polyethylene surface and an overmolded polyurethane layer, the method comprising:

sanding a first section of the polyethylene surface to produce a first roughened surface;

cleaning the first roughened surface with a cleaning agent to provide a first cleaned surface;

etching disruptions in the first cleaned surface to form a first treated surface; and overmolding the first treated surface with polyurethane to produce an overmolded polyurethane layer, wherein the overmolded polyurethane layer is adhered to the first treated surface.

24. The method of claim 23, wherein cleaning comprises cleaning the first roughened surface with isopropyl alcohol.

25. The method of claim 23, wherein etching disruptions is performed less than two minutes after cleaning the first roughened surface.

26. The method of claim 23, wherein overmolding the first treated surface is performed less than two minutes after etching disruptions in the first cleaned surface.

* * * * *

UNITED STATES PATENT AND TRADEMARK OFFICE
CERTIFICATE OF CORRECTION

| | | |
|---|---|---|
| PATENT NO. | : 7,489,843 B2 | Page 1 of 1 |
| APPLICATION NO. | : 11/702914 | |
| DATED | : February 10, 2009 | |
| INVENTOR(S) | : Carlson et al. | |

It is certified that error appears in the above-identified patent and that said Letters Patent is hereby corrected as shown below:

In the Claims

Col. 10, line 51, claim 18: "the enclosure if" should read --the enclosure is--

Signed and Sealed this
Sixteenth Day of December, 2014

Michelle K. Lee
*Deputy Director of the United States Patent and Trademark Office*